US012375229B2

(12) United States Patent
Wen et al.

(10) Patent No.: US 12,375,229 B2
(45) Date of Patent: Jul. 29, 2025

(54) METHOD FOR HANDLING RADIO LINK FAILURE AND DEVICE

(71) Applicant: VIVO MOBILE COMMUNICATION CO., LTD., Guangdong (CN)

(72) Inventors: Ming Wen, Guangdong (CN); Boubacar Kimba Dit Adamou, Guangdong (CN); Xiaodong Yang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 398 days.

(21) Appl. No.: 17/729,686

(22) Filed: Apr. 26, 2022

(65) Prior Publication Data

US 2022/0255689 A1 Aug. 11, 2022

Related U.S. Application Data

(63) Continuation of application No. PCT/CN2020/127135, filed on Nov. 6, 2020.

(30) Foreign Application Priority Data

Nov. 7, 2019 (CN) .......................... 201911084294.X (51) Int. Cl.
*H04L 5/00* (2006.01)
*H04W 72/542* (2023.01)
*H04W 76/19* (2018.01)

(52) U.S. Cl.
CPC .......... *H04L 5/0032* (2013.01); *H04W 72/542* (2023.01); *H04W 76/19* (2018.02)

(58) Field of Classification Search
CPC .... H04L 5/0032; H04W 76/19; H04W 72/542
See application file for complete search history.

(56) References Cited

U.S. PATENT DOCUMENTS

| 10,595,354 B1 * | 3/2020 | Zhou ..................... H04W 88/04 |
| 2012/0044813 A1 | 2/2012 | Nandagopal et al. |

(Continued)

FOREIGN PATENT DOCUMENTS

| CN | 102711204 A | 10/2012 |
| CN | 104468029 A | 3/2015 |

(Continued)

OTHER PUBLICATIONS

U.S. Appl. No. 62/805,015 provisional application (Year: 2019).*

(Continued)

*Primary Examiner* — Kenny S Lin
(74) *Attorney, Agent, or Firm* — BROOKS KUSHMAN P.C.

(57) ABSTRACT

A method for handling radio link failure and a device are disclosed. The method includes: obtaining a first failure report, where the first failure report indicates that a first node has received a notification of backhaul recovery failure from a parent node of the first node, or the first failure report indicates that link failure has occurred in a first link, where the parent node of the first node is in the first link; and transmitting the first failure report to a donor node through a second link. In the embodiments of the present invention, when RLF occurs in a radio link, a failure report can be reported to a donor node through a node configured with dual connectivity, so that the donor node can schedule and configure network resources based on the failure report.

14 Claims, 8 Drawing Sheets

(56) References Cited

U.S. PATENT DOCUMENTS

| | | | |
|---|---|---|---|
| 2014/0321263 A1 | 10/2014 | Wu | |
| 2016/0242224 A1 | 8/2016 | Liu et al. | |
| 2019/0082363 A1* | 3/2019 | Park | H04W 36/0079 |
| 2019/0253986 A1* | 8/2019 | Jeon | H04L 5/0048 |
| 2021/0068186 A1 | 3/2021 | Wu | |
| 2021/0084506 A1* | 3/2021 | Kimba Dit Adamou | H04W 40/12 |
| 2021/0195675 A1* | 6/2021 | Park | H04W 76/19 |
| 2022/0132337 A1* | 4/2022 | Muhammad | H04W 40/34 |

FOREIGN PATENT DOCUMENTS

| | | | |
|---|---|---|---|
| CN | 110022224 A | | 7/2019 |
| JP | 2021536706 A | | 12/2021 |
| WO | 2020051588 A1 | | 3/2020 |

OTHER PUBLICATIONS

Extended European Search Report for Application No. 20883863.1-1216; Dated Dec. 5, 2022, 15 pages.

FUTUREWEI: "Backhaul RLF Notification and Recovery Procedure", 3GPP Draft; R2-1913544, Chongqing, China; Dated Oct. 4, 2019, 4 pages.

3GPP "3rd Generation Partnership Project; Technical Specification Group Radio Access Network; NR; Study on Integrated Access and Backhaul; (Release 16)", 3GPP Draft; 38874-G00; Dated Jan. 11, 2019; 111 pages.

Huawei: "Backhaul RLF Recovery", 3GPP Draft; R3-192823; Dated May 13, 2019, 3 pages.

Ericsson: "Running CR to 38.331 on Integrated Access and Backhaul for NR", 3GPP Draft; R2-1914027, 3rd Generation Partnership Project (3GPP); Dated Nov. 6, 2019, 35 pages.

VIVO: "Discussion on IAB BH RLF report mechanism in case of DC", 3GPP Draft; R2-2000273; Dated Feb. 14, 2020, 3 pages.

Second Office Action for Japanese Application No. 2022-521693, dated Jul. 31, 2023, 2 Pages.

First Office Action for Chinese Application No. 201911084294.X, dated Jan. 20, 2022, 8 Pages.

International Search Report and Written Opinion for Application No. PCT/CN2020/127135, dated Feb. 5, 2021, 8 Pages.

Zte et al., "Discussion on IAB BH RLF Handling," 3GPP TSG RAN WG2 #107bis, Agenda item 6.1.5.1, Oct. 14-18, 2019, R2-1912589, Chongqing, China, 6 Pages.

NEC, "IAB backhaul RLF Handling," 3GPP TSG-RAN WG2 #107bis, Agenda item 6.1.5.1, Oct. 14-18, 2019, R2-1912981, Chongqing, China, 6 Pages.

* cited by examiner

METHOD FOR HANDLING RADIO LINK FAILURE AND DEVICE

CROSS-REFERENCE TO RELATED APPLICATIONS

This application is a continuation of PCT International Application No. PCT/CN2020/127135 filed on Nov. 6, 2020, which claims priority to Chinese Patent Application No. 201911084294.X, filed on Nov. 7, 2019, which are incorporated herein by reference in their entireties.

TECHNICAL FIELD

Embodiments of the present invention relate to the field of communications technologies, and specifically, to a method for handling radio link failure (RLF) and a device.

BACKGROUND

Figure 1:
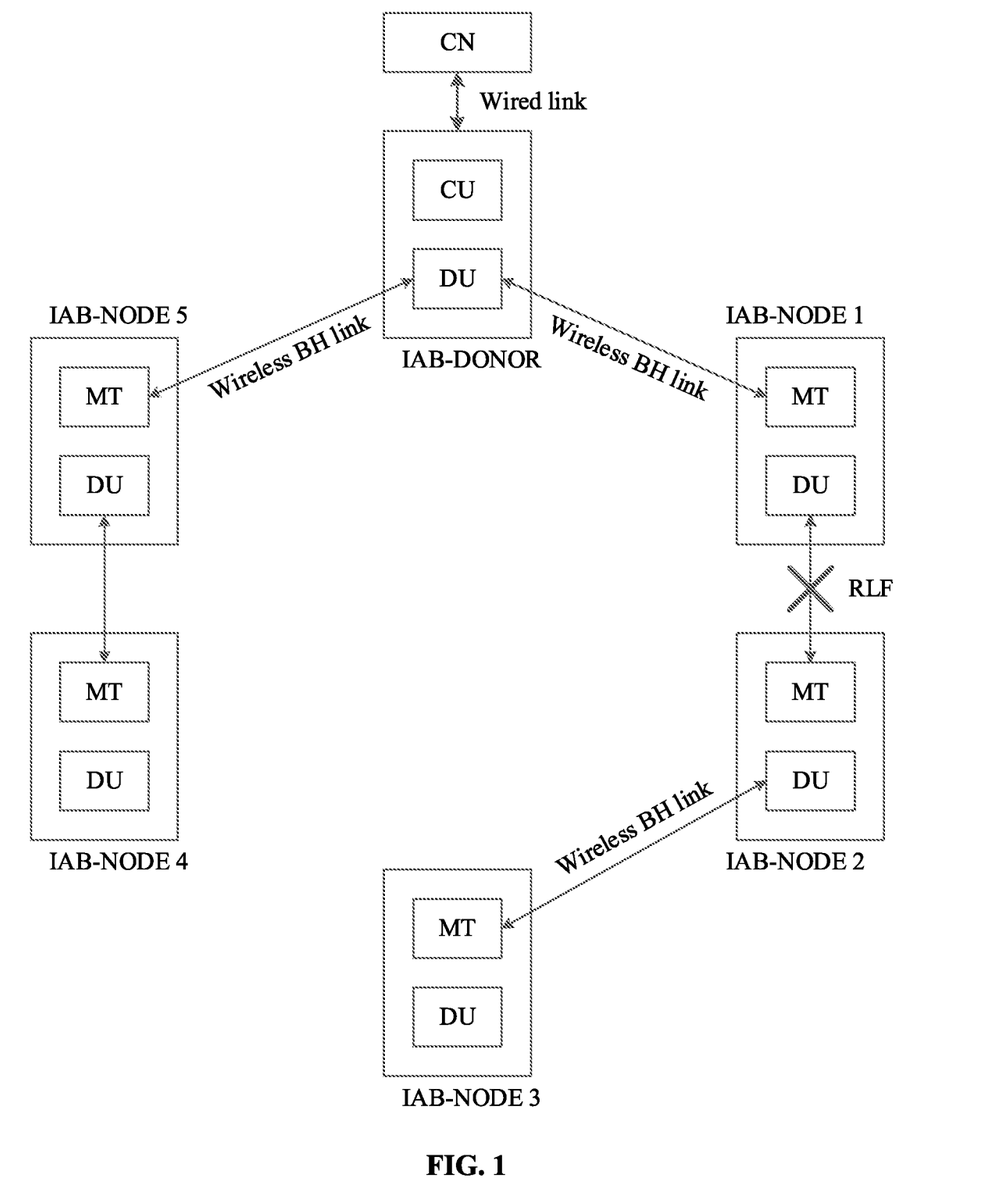
FIG. 1 is a schematic diagram of IAB in a non-DC scenario.

As shown in FIG. 1, integrated access and backhaul nodes (IAB-node) are connected through wireless connection, resulting in unstable links. When RLF occurs in a radio link between IAB-node 1 and IAB-node 2 and IAB-node 2 attempts to reconnect but fails, IAB-node 2 will notify IAB-node 3 of occurrence of RLF in the radio link and trigger IAB-node 3 to run a re-establishment procedure.

However, due to the occurrence of RLF in the radio link between IAB-node 1 and IAB-node 2, IAB-node 3 cannot connect to an integrated access and backhaul donor (IAB-donor) node through IAB-node 1. As a result, the IAB-donor node cannot effectively schedule and configure network resources.

SUMMARY

Embodiments of the present invention are to provide a method for handling radio link failure and a device.

According to a first aspect of the embodiments of the present invention, a method for handling radio link failure is provided, applied to a first node in a relay network architecture in which data transmission is implemented through a relay node, where the first node has dual connectivity with a donor node through a first link and a second link, including:
obtaining a first failure report, where the first failure report indicates that the first node has received a notification of backhaul recovery failure from a parent node of the first node, or the first failure report indicates that link failure has occurred in the first link, where the parent node of the first node is in the first link; and
transmitting the first failure report to the donor node through the second link.

According to a second aspect of the embodiments of the present invention, a method for handling radio link failure is further provided, applied to a donor node in a relay network architecture in which data transmission is implemented through a relay node, including:
obtaining, through a second link, a first failure report sent by a first node, where the first failure report indicates that the first node has received a notification of backhaul recovery failure from a parent node of the first node, or the first failure report indicates that link failure has occurred in the first link, where the parent node of the first node is in the first link; where
the first node has dual connectivity with the donor node through the first link and the second link.

According to a third aspect of the embodiments of the present invention, a method for handling radio link failure is further provided, applied to a third node in a relay network architecture in which data transmission is implemented through a relay node, including:
in a case that RLF has occurred in a link between the third node and a parent node of the third node and a recovery attempt has failed, generating a second failure report; and
transmitting the second failure report to a child node of the third node, where the child node of the third node has dual connectivity with a donor node.

According to a fourth aspect of the embodiments of the present invention, a first node is further provided, where the first node is located in a relay network architecture in which data transmission is implemented through a relay node, and the first node has dual connectivity with a donor node through a first link and a second link, including:
a first obtaining module, configured to obtain a first failure report, where the first failure report indicates that the first node has received a notification of backhaul recovery failure from a parent node of the first node, or the first failure report indicates that backhaul recovery failure has occurred in the parent node of the first node, or the first failure report indicates that link failure has occurred in the first link, where the parent node of the first node is in the first link; and
a first transmitting module, configured to transmit the first failure report to the donor node through the second link.

According to a fifth aspect of the embodiments of the present invention, a donor node is further provided, where the donor node is located in a relay network architecture in which data transmission is implemented through a relay node, including:
a second transmitting module, configured to obtain, through a second link, a first failure report sent by a first node, where the first failure report indicates that the first node has received a notification of backhaul recovery failure from a parent node of the first node, or the first failure report indicates that backhaul recovery failure has occurred in the parent node of the first node, or the first failure report indicates that link failure has occurred in the first link, where the parent node of the first node is in the first link; where
the first node has dual connectivity with the donor node through the first link and the second link.

According to a sixth aspect of the embodiments of the present invention, a third node is further provided, where the third node is located in a relay network architecture in which data transmission is implemented through a relay node, including:
a generation module, configured to, in a case that RLF has occurred in a link between the third node and a parent node of the third node and a recovery attempt has failed, generate a second failure report; and
a third transmitting module, configured to transmit the second failure report to a child node of the third node, where the child node of the third node has dual connectivity with a donor node.

According to a seventh aspect of the embodiments of the present invention, a communications device is further provided, including a processor, a memory, and a program stored in the memory and capable of running on the processor, where when the program is executed by the processor, the steps of the method for handling radio link failure according to the first aspect are implemented, or the steps of the method for handling radio link failure according to the second aspect are implemented, or the method for handling radio link failure according to the third aspect are implemented.

According to an eighth aspect of the embodiments of the present invention, a computer-readable storage medium is further provided, where the computer-readable storage medium stores a computer program, and when the computer program is executed by a processor, the steps of the method for handling radio link failure according to the first aspect are implemented, or the steps of the method for handling radio link failure according to the second aspect are implemented, or the method for handling radio link failure according to the third aspect are implemented.

BRIEF DESCRIPTION OF DRAWINGS

Other advantages and benefits will become apparent to those of ordinary skill in the art by reading detailed description of the exemplary embodiments below. The accompanying drawings are merely intended to illustrate the objectives of the preferred embodiments and are not intended to limit the present invention. Throughout the accompanying drawings, the same reference numerals represent the same components. In the accompanying drawings.

DETAILED DESCRIPTION

Figure 2:
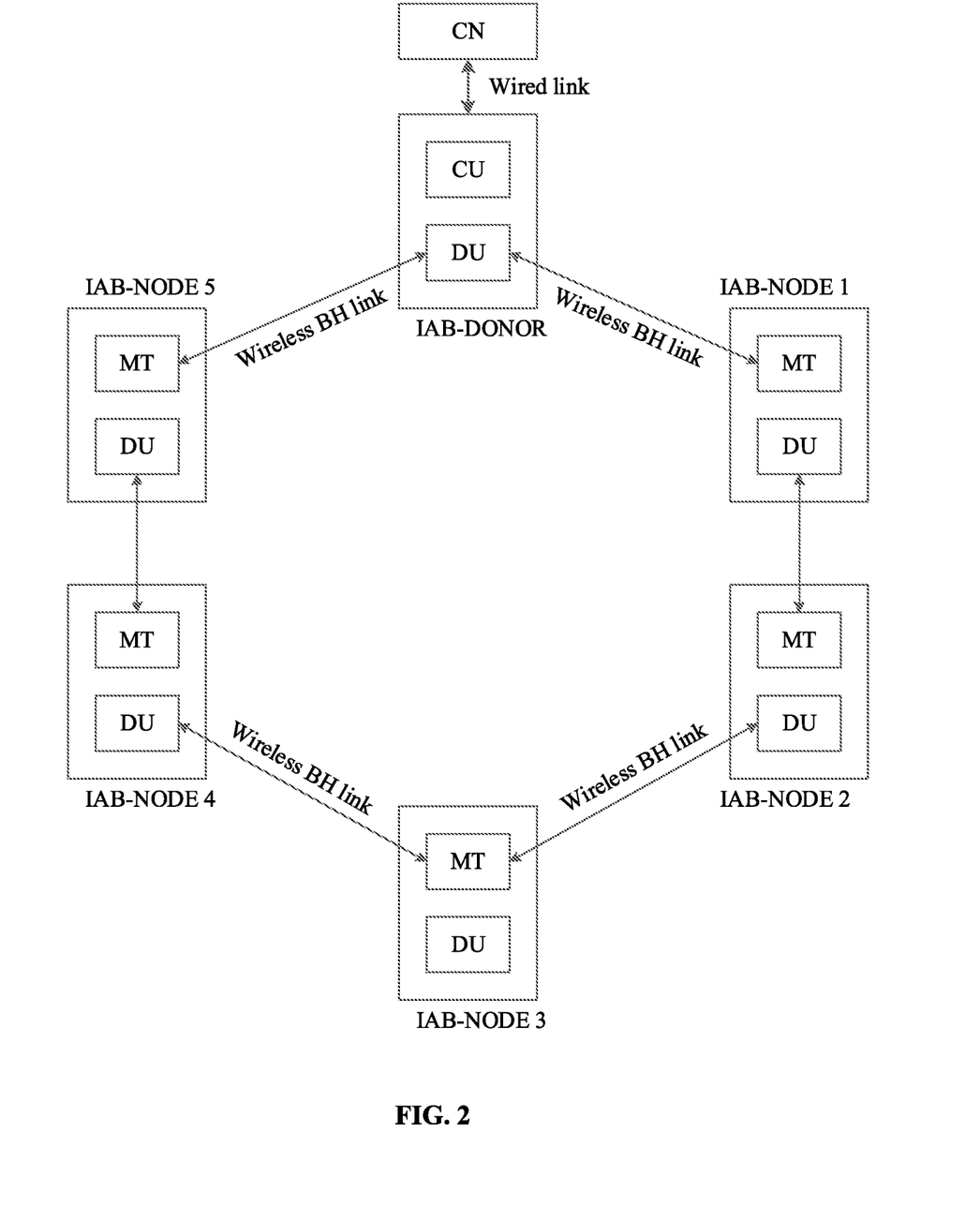
FIG. 2 is a schematic diagram of an IAB network architecture.

For better understanding of the embodiments of the present invention, the following technical points are first described:

1. IAB Dual Connectivity (DC) Scenario:

An integrated access and backhaul (IAB) node is introduced in new radio (NR). An IAB-node can extend network coverage through radio concatenation. As shown in FIG. 2, an IAB-donor is connected to a core network (CN) through a wired link (such as an optical fiber). Other IAB-nodes are connected to neighboring IAB-nodes or the IAB-donor through wireless backhaul. The IAB-donor includes a centralized unit (CU) and a distributed unit (DU), where the centralized unit is responsible for processing non-real-time protocols and services and the distributed unit is responsible for processing physical layer protocols and real-time services. The IAB-node includes a CU, and also includes a mobile termination (MT) as a device that connects the IAB-donor and the IAB-node. When an MT of an IAB-node (for example, node A) is connected to a DU of an upstream node (for example, node B), node A is defined as a child node and node B is defined as a parent node. As shown in FIG. 2, an MT of IAB-node 2 is connected to a DU of IAB-node 1, and in this case, IAB-node 1 is a parent node and IAB-node 2 is a child node.

In addition, a DC-like scenario is introduced to IAB in NR. To be specific, when a child node is configured with DC, the IAB-node may be connected to two parent nodes simultaneously, as shown in a relationship between IAB-node 3 (child node) and IAB-node 4 (parent node)/IAB-node 2 (parent node) in FIG. 2.

Figure 3:
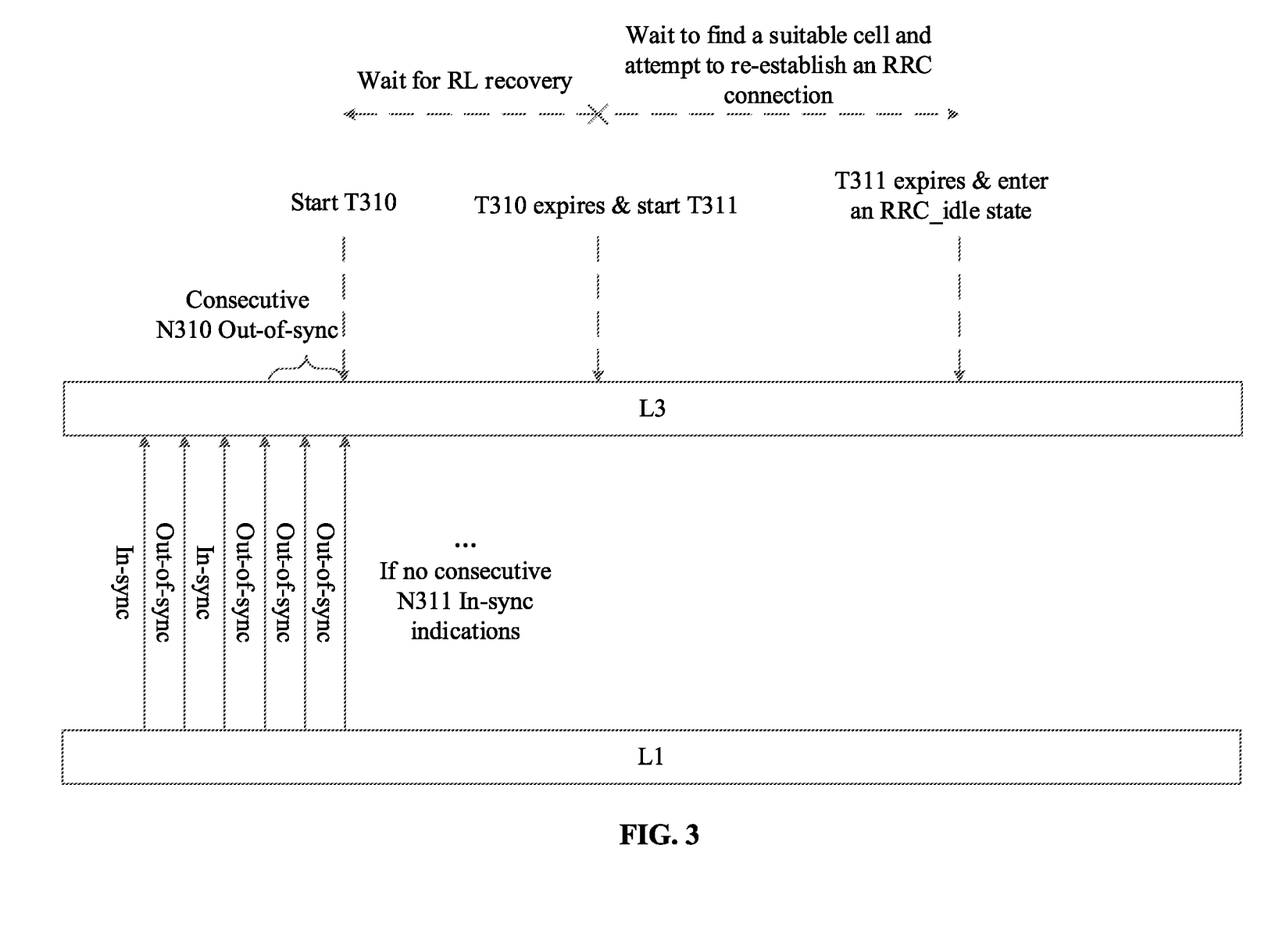
FIG. 3 is a schematic diagram of radio link monitoring.

2. Radio Link Monitoring (RLM) in a Primary Cell (Primary Cell, PCell) and RLF:

As shown in FIG. 3, in an RLM function of a long term evolution (LTE), a terminal (such as user equipment (UE)) monitors a radio link by measuring a signal to interference plus noise ratio (SINR) of a cell reference signal (CRS) corresponding to a physical downlink control channel (PDCCH) of a PCell. When a physical layer of the UE finds, through measurement, that the SINR of the vCRS corresponding to the PDCCH of the PCell is lower than a specified threshold, it is determined that the radio link is out of synchronization (out-of-sync). The physical layer sends an out-of-sync indication to a higher layer (for example, a radio resource control (RRC) layer). If the RRC layer consecutively receives N310 out-of-sync indications, the RRC layer of the UE starts a timer T310.

If the measured CRS corresponding to the PDCCH of the PCell is higher than the specified threshold, it is determined that the radio link is in synchronization (in-sync). In this case, the physical layer sends an in-sync indication to the higher layer (for example, the RRC layer). If the RRC layer consecutively receives N311 in-sync indications, the UE stops the timer T310.

If the timer T310 expires, the UE determines that radio link failure occurs in the UE and starts a timer T311. During running of T311, the UE will attempt to find a suitable cell to perform RRC connection re-establishment. Before the re-establishment is successful, user-plane data reception and transmission between the UE and a network will be interrupted.

If the UE fails to re-establish a connection before T311 expires, the UE switches from an RRC connected (RRC_CONNECTED) state to an RRC idle (RRC_IDLE) state.

Duration of N310, N311, T310 and T311 is configured by the network.

Apart from determining based on the downlink signal, the UE will also determine that radio link failure has occurred and trigger a re-establishment procedure when a maximum number of RLC uplink transmissions of the UE is reached.

When a maximum number of random access channel (RACH) transmissions of the UE is reached, the UE will also determine that radio link failure has occurred and trigger a re-establishment procedure.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In the specification and claims of this application, the term "include" and any other variants mean to cover a non-exclusive inclusion. For example, a process, method, system, product, or device that includes a list of steps or units is not necessarily limited to those steps or units, but may include other steps or units not expressly listed or inherent to such a process, method, product, or device. In addition, in the specification and claims, the use of "and/or" represents presence of at least one of the connected objects, for example, "A and/or B" indicates that the following three cases: only A, only B, or both A and B.

In the embodiments of the present invention, the word such as "an example" or "for example" is used to represent giving an example, an instance, or an illustration. Any embodiment or design solution described as "an example" or "for example" in the embodiments of the present invention shall not be interpreted to be more preferential or advantageous than other embodiments or design solutions. To be precise, the terms such as "an example" or "for example" are intended to present a related concept in a specific manner.

Technologies described in this specification are not limited to a long term evolution (LTE) or LTE-Advanced (LTE-A) system, and may also be applied to various wireless communications systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems.

The terms "system" and "network" are often used interchangeably. The CDMA system can implement radio technologies such as CDMA2000 and universal terrestrial radio access (UTRA). The UTRA includes wideband CDMA (WCDMA) and other CDMA variants. The TDMA system can implement radio technologies such as global system for mobile communications (GSM). The OFDMA system can implement radio technologies such as ultra mobile broadband (UMB), evolved UTRA (Evolution-UTRA, E-UTRA), IEEE 802.11 (Wi-Fi), IEEE 802.16 (WiMAX), IEEE 802.20, and Flash-OFDM. The UTRA and E-UTRA are part of the universal mobile telecommunications system (UMTS). LTE and more advanced LTE (such as LTE-A) are new releases of UMTS that use E-UTRA. UTRA, E-UTRA, UMTS, LTE, LTE-A, and GSM are described in documents from an organization called 3rd generation partnership project (3GPP). CDMA2000 and UMB are described in documents from an organization named "3rd Generation Partnership Project 2" (3GPP2). The technologies described herein are applicable not only to the above-mentioned systems and radio technologies, but also to other systems and radio technologies.

An embodiment of the present invention provides a method for handling radio link failure, and the method is executed by a first node in a relay network architecture in which data transmission is implemented through a relay node, where the first node has dual connectivity with a donor node through a first link and a second link, meaning that the first node is configured with DC and the first node may be referred to as a DC node.

As shown in FIG. 2, a link that sequentially connects IAB-node 3, IAB-node 2, IAB-node 1, and IAB-donor may be understood as the first link, and a link that sequentially connects IAB-node 3, IAB-node 4, JAB-node 5, and IAB-donor may be understood as the second link.

In some embodiments, the relay network architecture is an IAB network architecture or a vehicle to everything (V2X) architecture. For example, when the relay network architecture is an JAB network architecture, the first node is an IAB-node configured with DC.

Figure 4:
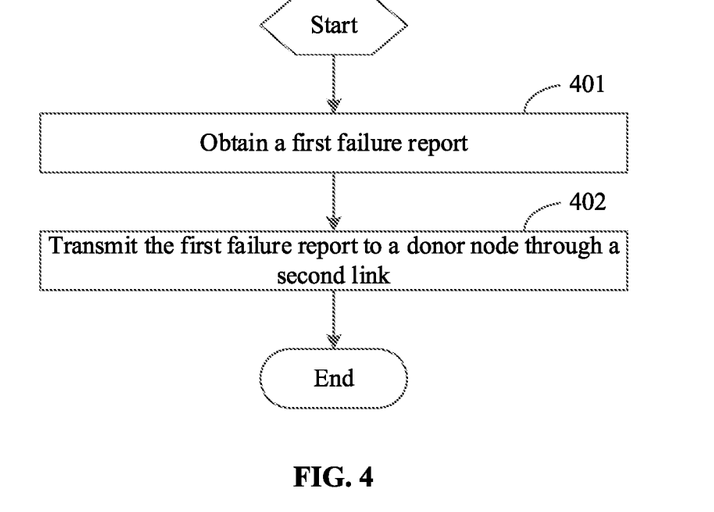
FIG. 4 is a first flowchart of a method for handling radio link failure according to an embodiment of the present invention.

As shown in FIG. 4, the method specifically includes step 401 and step 402.

Step 401: Obtain a first failure report (failure report).

In the embodiments of the present invention, the first failure report may indicate any one of the following:
(1) the first node has received a notification of backhaul recovery failure from a parent node (BH RLF recovery failure from parent's indication) of the first node, where the parent node of the first node is in the first link; and
(2) link failure has occurred in the first link.

In some embodiments, the first failure report may include one or more of the following:
(1) notification of backhaul recovery failure from the parent node of the first node;
(2) link quality information of the parent node of the first node;
(3) link quality information of the first node;
(4) a first measurement result, where the first measurement result includes a result obtained by the parent node of the first node measuring a second node; and
(5) a second measurement result, where the second measurement result includes a result obtained by the first node measuring the second node; where
the second node includes at least some of nodes through which the first failure report passes to be reported to the donor node.

Step 402: Transmit the first failure report to the donor node through the second link.

In the embodiments of the present invention, the first failure report is transmitted to the donor node through the second link in a manner of hop-by-hop transmission.

In the embodiments of the present invention, when RLF occurs in a radio link, a failure report can be reported to a donor node through a node configured with dual connectivity, so that the donor node can schedule and configure network resources based on the failure report.

An embodiment of the present invention provides a method for handling radio link failure, and the method is executed by a donor node in a relay network architecture in which data transmission is implemented through a relay node. For example, the donor node is a donor node in an IAB network architecture or a vehicle to everything architecture.

Figure 5:
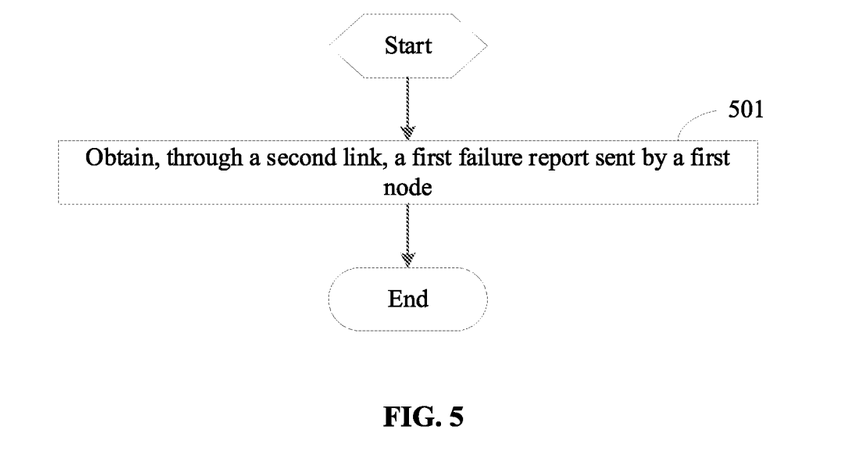
FIG. 5 is a second flowchart of a method for handling radio link failure according to an embodiment of the present invention.

As shown in FIG. 5, the method specifically includes step 501.

Step 501: Obtain, through a second link, a first failure report sent by a first node.

In the embodiments of the present invention, the first failure report may indicate any one of the following:
(1) the first node has received a notification of backhaul recovery failure from a parent node (BH RLF recovery failure from parent's indication) of the first node, where the parent node of the first node is in the first link; and
(2) link failure has occurred in the first link.

In an embodiment of the present invention, the method further includes: adjusting, based on the first failure report, a network parameter or a network topology. To be specific, the donor node may analyze the first failure report and reconfigure nodes in the network.

In some embodiments, the first failure report may include one or more of the following:
(1) notification of backhaul recovery failure from the parent node of the first node;
(2) link quality information of the parent node of the first node;

(3) link quality information of the first node;
(4) a first measurement result, where the first measurement result includes a result obtained by the parent node of the first node measuring a second node; and
(5) a second measurement result, where the second measurement result includes a result obtained by the first node measuring the second node; where
the second node includes at least some of nodes through which the first failure report passes to be reported to the donor node.

As shown in FIG. 2, IAB-node 3 is equivalent to the first node, IAB-node 2 is the third node, IAB-node 1 is the parent node of the third node, and IAB-node 4 and IAB-node 5 are equivalent to the second nodes.

In the embodiments of the present invention, a donor node can obtain a failure report reported by a first node configured with DC, so that the donor node can schedule and configure network resources based on the failure report.

An embodiment of the present invention provides a method for handling radio link failure, and the method is executed by a third node in a relay network architecture in which data transmission is implemented through a relay node. It can be understood the third node is a node that has encountered RLF.

In some embodiments, the relay network architecture is an IAB network architecture or a vehicle to everything architecture.

Figure 6:
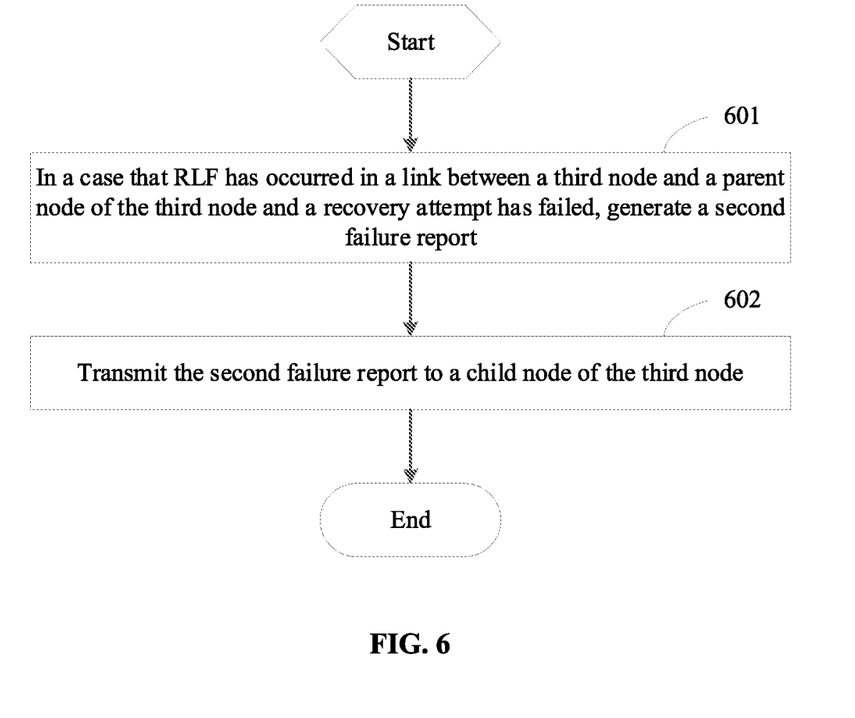
FIG. 6 is a third flowchart of a method for handling radio link failure according to an embodiment of the present invention.

As shown in FIG. 6, the method specifically includes step 601 and step 602.

Step 601: In a case that RLF has occurred in a link between a third node and a parent node of the third node and a recovery attempt has failed, generate a second failure report.

In the embodiments of the present invention, in a case that the third node satisfies a first condition, a second failure report is generated; where the first condition includes one or more of the following:
(1) expiry of Timer 310 (T310) in a secondary cell group (t310-expirySCG);
(2) failure of reconfiguration with sync in a secondary cell group (syncReconfigFailure-SCG)
(3) reconfiguration failure in a secondary cell group (scg-ReconfigFailure);
(4) failure of signaling radio bearer 3 integrity check (srb3-IntegrityFailure);
(5) a maximum number of uplink transmissions being exceeded (rlc-MaxNumRetx); and
(6) occurrence of a random access problem (randomAccessProblem).

In the embodiments of the present invention, the second failure report is equivalent to an initial failure report. For example, the second failure report includes link quality information of the third node, that is, link quality information of a node that has encountered RLF.

Step 602: Transmit the second failure report to a child node of the third node.

In the embodiments of the present invention, the child node of the third node has dual connectivity with a donor node.

In the embodiments of the present invention, in a case that RLF has occurred in a link between a third node and a parent node of the third node and a recovery attempt has failed, the third node generates a second failure report and transmits the second failure report to a child node of the third node. Because the child node of the third node has dual connectivity with a donor node, the donor node can obtain the second failure report from the child node of the third node, and then schedule and configure network resources based on the second failure report.

The following describes the methods provided in the embodiments of the present invention with reference to specific examples.

Figure 7:
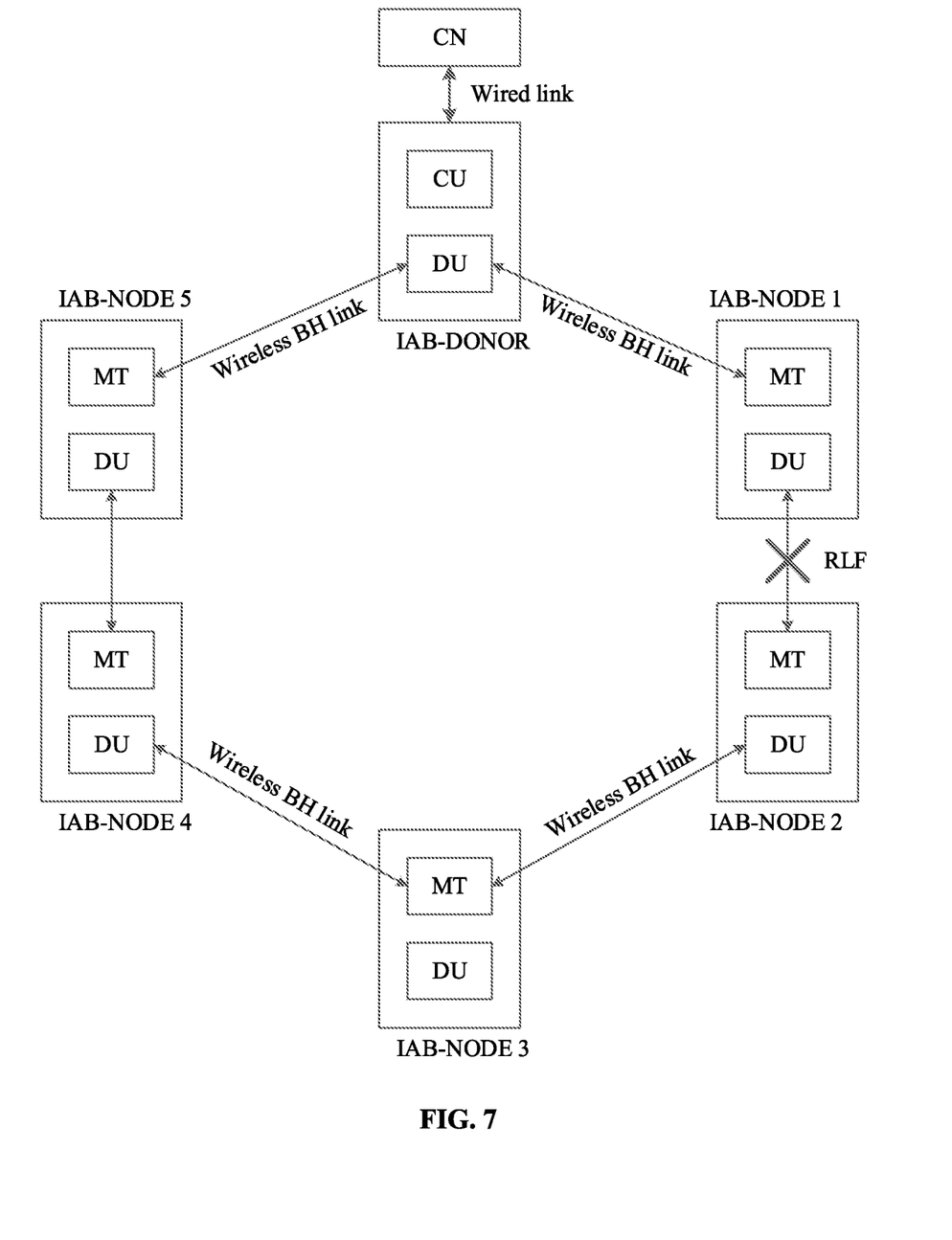
FIG. 7 is a schematic diagram of IAB in a DC scenario according to an embodiment of the present invention.

As shown in FIG. 7, a DC-like scenario is introduced to IAB in NR. To be specific, when a child node is configured with DC, the IAB-node may be connected to two parent nodes simultaneously, as shown in a relationship between IAB-node 3 (child node) and IAB-node 4 (parent node)/IAB-node 2 (parent node) in FIG. 7.

For example, when radio link failure (RLF) occurs in a radio link between IAB-node 1 and IAB-node 2 and IAB-node 2 attempts to reconnect but fails, link failure of IAB-node 2 will be reported to IAB-node 4.

The handling method is as follows:

When IAB-node 2 detects that radio link failure has occurred between IAB-node 1 and IAB-node 2 and attempts to reconnect but fails, IAB-node 2 generates a failure report and transmits the failure report to IAB-node 3. After receiving the failure report, IAB-node 3 reports the failure report to another parent node. As shown in FIG. 7, IAB-node 3 reports the failure report to IAB-node 4.

The failure report is triggered in any one of the following cases:
(1) expiry of T310 in a secondary cell group (t310-expirySCG): radio link failure (radio link failure);
(2) failure of reconfiguration with sync in a secondary cell group (syncReconfigFailure-SCG): failure of SCG reconfiguration with sync;
(3) reconfiguration failure in a secondary cell group (scg-ReconfigFailure): SCG configuration failure for RRC message on SRB3 (SCG configuration failure for RRC message on SRB3);
(4) failure of signaling radio bearer 3 integrity check (srb3-IntegrityFailure): SCG integrity check failure;
(5) a maximum number of uplink transmissions being exceeded (rlc-MaxNumRetx): exceeding the maximum uplink transmission timing difference (Exceeding the maximum uplink transmission timing difference);
(6) occurrence of a random access problem (randomAccessProblem); and
(7) BH RLF recovery failure from parent's indication.

The failure report is backhauled in link L in a manner of hop-by-hop transmission until it is transmitted to the IAB-donor.

Link L is defined as a link in which data is transmitted from a child node of an IAB-node that has encountered RLF toward a DC-node, and finally to the IAB-donor. For example, a link that sequentially connects IAB-node 2, IAB-node 3, IAB-node 4, IAB-node 5, and IAB-donor may be understood as link L.

The initial failure report may include link quality information of a node that has encountered RLF.

Further, after receiving the failure report, IAB-node 3 transmits the failure report to IAB-node 4, then to IAB-node 5, and finally to IAB-donor.

Further, the failure report may also carry a measurement result obtained by IAB-node 3 measuring IAB-node 2, and measurement results of measuring other IAB-nodes, that is, measurement results of measuring, by a next child node of a child node that has encountered RLF, all IAB-nodes through which the failure report passes to be reported to the IAB-donor, allowing the IAB-donor to reconfigure the IAB-nodes conveniently.

Further, when IAB-node 2 sends a BH RLF recovery failure notification to IAB-node 3, the notification may also carry a measurement result obtained by IAB-node 2 measuring IAB-node 1, and measurement results of measuring other IAB-nodes, that is, measurement results of measuring, by a child node of the node that has encountered RLF, all IAB-nodes through which the notification passes to be reported to the IAB-donor, allowing the IAB-donor to reconfigure the IAB-nodes conveniently.

Figure 8:
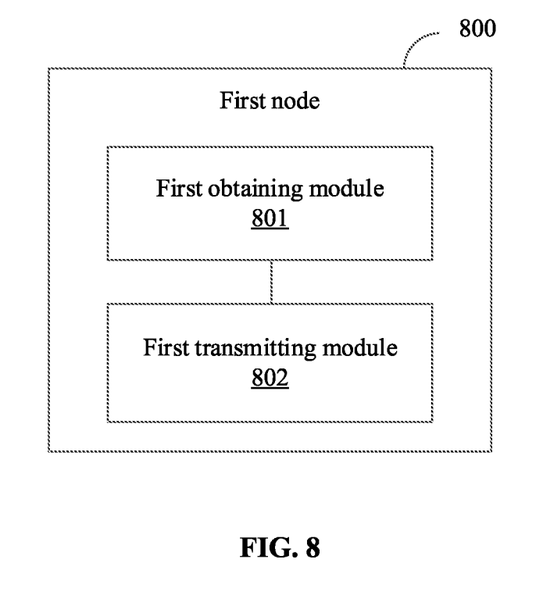
FIG. 8 is a schematic diagram of a first node according to an embodiment of the present invention.

As shown in FIG. 8, an embodiment of the present invention provides a first node 800, where the first node 800 is located in a relay network architecture in which data transmission is implemented through a relay node, the first node 800 has dual connectivity with a donor node through a first link and a second link, and the first node 800 includes:
- a first obtaining module 801, configured to obtain a first failure report, where the first failure report indicates that the first node has received a notification of backhaul recovery failure from a parent node of the first node, or the first failure report indicates that link failure has occurred in the first link, where the parent node of the first node is in the first link; and
- a first transmitting module 802, configured to transmit the first failure report to the donor node through the second link.

Optionally, the first failure report includes one or more of the following:
- the notification of backhaul recovery failure from the parent node of the first node;
- link quality information of the parent node of the first node;
- link quality information of the first node;
- a first measurement result, where the first measurement result includes a result obtained by the parent node of the first node measuring a second node; and
- a second measurement result, where the second measurement result includes a result obtained by the first node measuring the second node; where
- the second node includes at least some of nodes through which the first failure report passes to be reported to the donor node.

Optionally, the first transmitting module is configured to transmit the first failure report to the donor node through the second link in a manner of hop-by-hop transmission.

Optionally, the relay network architecture is an IAB network architecture or a vehicle to everything architecture.

In the embodiments of the present invention, when RLF occurs in a radio link, a failure report can be reported to a donor node through a node configured with dual connectivity, so that the donor node can schedule and configure network resources based on the failure report.

Figure 9:
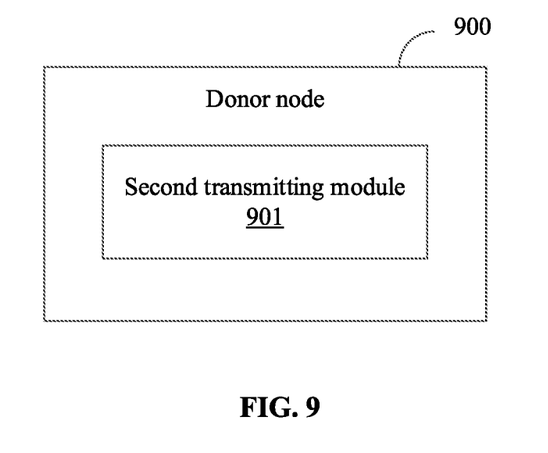
FIG. 9 is a schematic diagram of a donor node according to an embodiment of the present invention.

As shown in FIG. 9, an embodiment of the present invention provides a donor node 900, where the donor node 900 is located in a relay network architecture in which data transmission is implemented through a relay node, and the donor node 900 includes:
- a second transmitting module 901, configured to obtain, through a second link, a first failure report sent by a first node, where the first failure report indicates that the first node has received a notification of backhaul recovery failure from a parent node of the first node, or the first failure report indicates that link failure has occurred in a first link, where the parent node of the first node is in the first link; where
- the first node has dual connectivity with the donor node through the first link and the second link.

Optionally, the first failure report includes one or more of the following:
- the notification of backhaul recovery failure from the parent node of the first node;
- link quality information of the parent node of the first node;
- link quality information of the first node;
- a first measurement result, where the first measurement result includes a result obtained by the parent node of the first node measuring a second node; and
- a second measurement result, where the second measurement result includes a result obtained by the first node measuring the second node; where
- the second node includes at least some of nodes through which the first failure report passes to be reported to the donor node.

In an embodiment of the present invention, the donor node 900 further includes:
- an adjustment module, configured to adjust, based on the first failure report, a network parameter or a network topology.

Optionally, the relay network architecture is an IAB network architecture or a vehicle to everything architecture.

In the embodiments of the present invention, a donor node can obtain a failure report reported by a first node configured with DC, so that the donor node can schedule and configure network resources based on the failure report.

Figure 10:
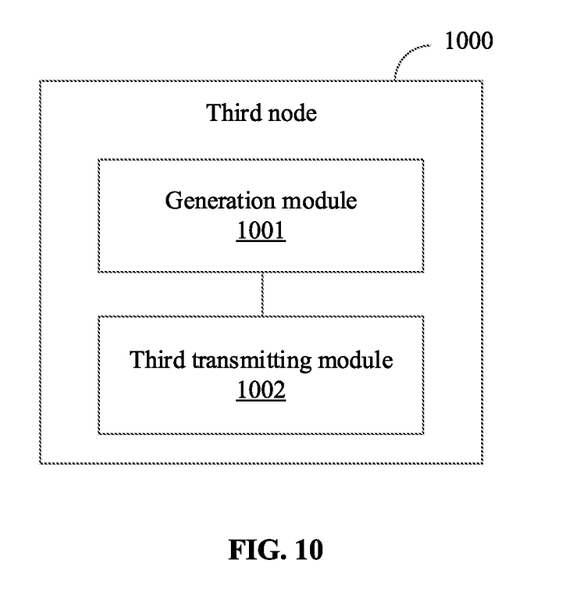
FIG. 10 is a schematic diagram of a fourth node according to an embodiment of the present invention.

As shown in FIG. 10, an embodiment of the present invention provides a third node 1000, where the third node 1000 is located in a relay network architecture in which data transmission is implemented through a relay node, and the third node 1000 includes:
- a generation module 1001, configured to, in a case that RLF has occurred in a link between the third node and a parent node of the third node and a recovery attempt has failed, generate a second failure report; and
- a third transmitting module 1002, configured to transmit the second failure report to a child node of the third node, where the child node of the third node has dual connectivity with a donor node.

Optionally, the second failure report includes:
- in a case that the third node satisfies a first condition, generating the second failure report; where
- the first condition includes one or more of the following:
- expiry of T310 in a secondary cell group;
- failure of reconfiguration with sync in a secondary cell group;
- reconfiguration failure in a secondary cell group;
- failure of signaling radio bearer 3 integrity check;
- a maximum number of uplink transmissions being exceeded; and
- occurrence of a random access problem.

Optionally, the second failure report includes link quality information of the third node.

Optionally, the relay network architecture is an IAB network architecture or a vehicle to everything architecture.

In the embodiments of the present invention, in a case that RLF has occurred in a link between a third node and a parent node of the third node and a recovery attempt has failed, the third node generates a second failure report and transmits the second failure report to a child node of the third node. Because the child node of the third node has dual connectivity with a donor node, the donor node can obtain the failure report from the child node of the third node, and then schedule and configure network resources based on the failure report.

Figure 11:
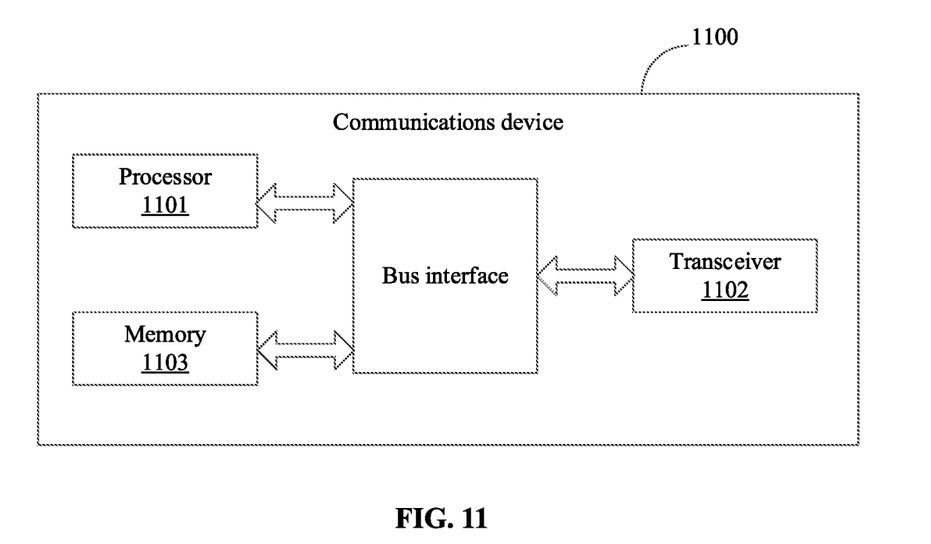
FIG. 11 is a schematic diagram of a communications device according to an embodiment of the present invention.

Referring to FIG. 11, FIG. 11 is a structural diagram of a communications device to which the embodiments of the present invention are applied. As shown in FIG. 11, the communications device 1100 includes a processor 1101, a transceiver 1102, a memory 1103, and a bus interface. The processor 1101 may be responsible for managing a bus architecture and general processing. The memory 1103 may store data that is used when the processor 1101 performs an operation.

In an embodiment of the present invention, the communications device 1100 further includes a program stored in the memory 1103 and capable of running on the processor 1101. When the program is executed by the processor 1101, steps of the foregoing method shown in FIG. 4, FIG. 5, or FIG. 6 are implemented.

In FIG. 11, a bus architecture may include any quantity of interconnected buses and bridges, specifically for interconnecting various circuits of one or more processors represented by the processor 1101 and a memory represented by the memory 1103. The bus architecture may further interconnect various other circuits such as a peripheral device, a voltage regulator, and a power management circuit. These are all common sense in the art, and therefore are not further described in this specification. The bus interface provides an interface. The transceiver 1102 may be a plurality of components, including a transmitter and a receiver, and provides units for communicating with a variety of other apparatuses on a transmission medium.

The communications device provided in this embodiment of the present invention can execute the foregoing method embodiment in FIG. 4, FIG. 5 or FIG. 6, with a similar implementation principle and similar technical effects. Details are not repeated herein in this embodiment.

Method or algorithm steps described with reference to the content disclosed in the present invention may be implemented by hardware, or may be implemented by a processor by executing a software instruction. The software instruction may include a corresponding software module. The software module may be stored in a random access memory (RAM), a flash memory, a read-only memory (ROM), an erasable programmable read-only memory (Erasable PROM, EPROM), an electrically erasable programmable read-only memory (Electrically EPROM, EEPROM), a register, a hard disk, a removable hard disk, a compact disc read-only memory, or a storage medium in any other forms well-known in the art. For example, a storage medium is coupled to the processor, enabling the processor to read information from the storage medium or write information into the storage medium. Certainly, the storage medium may be a component of the processor. The processor and the storage medium may be located in an application-specific integrated circuit (ASIC). In addition, the ASIC may be located in a core-network interface device. Certainly, the processor and the storage medium may exist in the core-network interface device as discrete components.

A person skilled in the art should be aware that, in the foregoing one or more examples, functions described in the present invention may be implemented by hardware, software, firmware, or any combination thereof. In the case of implementation by software, the foregoing functions may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another place. The storage medium may be any available medium accessible by a general-purpose or dedicated computer.

The objectives, technical solutions, and beneficial effects of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made based on the technical solutions of the present invention shall fall within the protection scope of the present invention.

A person skilled in the art should understand that the embodiments of the present invention may be provided as a method, a system, or a computer program product. Therefore, the embodiments of the present invention may use a form of hardware only embodiments, software only embodiments, or embodiments with a combination of software and hardware. Moreover, the embodiments of the present invention may use a form of a computer program product that is implemented on one or more computer-usable storage media (including but not limited to a disk memory, a CD-ROM, an optical memory, and the like) that include computer-usable program code.

The embodiments of the present invention are described with reference to the flowcharts and/or block diagrams of the method, the device (system), and the computer program product according to the embodiments of the present invention. It should be understood that computer program instructions may be used to implement each process and/or each block in the flowcharts and/or the block diagrams, or a combination of a process and/or a block in the flowcharts and/or the block diagrams. These computer program instructions may be provided to a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

It can be understood that the embodiments described in some embodiments of the present disclosure may be implemented by hardware, software, firmware, middleware, microcode, or a combination thereof. For hardware implementation, a module, a unit, a sub-module, a sub-unit, or the like may be implemented in one or more application-specific integrated circuits (ASIC), digital signal processors (DSP), digital signal processing devices (DSP Device, DSPD), programmable logic devices (PLD), field-programmable gate arrays (FPGA), general-purpose processors, controllers, microcontrollers, microprocessors, and other electronic units for performing the functions described in this application, or a combination thereof.

Obviously, a person skilled in the art can make various modifications and variations to the embodiments of the present invention without departing from the spirit and scope of the present invention. The present invention is intended to cover these modifications and variations provided that they fall within the scope of protection defined by the following claims and their equivalent technologies.

What is claimed is:

1. A method for handling radio link failure, applied to a first node in a relay network architecture in which data transmission is implemented through a relay node, wherein the first node has dual connectivity with a donor node through a first link and a second link, and the method comprises:
   obtaining a first failure report, wherein the first failure report indicates that the first node has received a notification of backhaul recovery failure from a parent node of the first node, or the first failure report indicates that link failure has occurred in the first link, wherein the parent node of the first node is in the first link; and
   transmitting the first failure report to the donor node through the second link;
   wherein the first failure report comprises:
   a first measurement result, wherein the first measurement result comprises a result obtained by the parent node measuring a second node; and
   a second measurement result, wherein the second measurement result comprises a result obtained by the first node measuring the second node; wherein
   the second node comprises at least some of nodes through which the first failure report passes to be reported to the donor node.

2. The method according to claim 1, wherein the first failure report further comprises one or more of the following:
   the notification of backhaul recovery failure from the parent node of the first node;
   link quality information of the parent node of the first node; and
   link quality information of the first node.

3. The method according to claim 1, wherein the transmitting the first failure report to the donor node through the second link comprises:
   transmitting the first failure report to the donor node through the second link in a manner of hop-by-hop transmission.

4. The method according to claim 1, wherein the relay network architecture is an integrated access and backhaul node IAB network architecture or a vehicle to everything architecture.

5. A communications device, comprising a processor, a memory, and a program stored in the memory and capable of running on the processor, wherein the program, when being executed by the processor, implements the steps of the method for handling radio link failure according to claim 1.

6. The communications device according to claim 5, where the first failure report further comprises one or more of the following:
   the notification of backhaul recovery failure from the parent node of the first node;
   link quality information of the parent node of the first node; and
   link quality information of the first node.

7. The communications device according to claim 5, wherein the step of transmitting the first failure report to the donor node through the second link comprises:
   transmitting the first failure report to the donor node through the second link in a manner of hop-by-hop transmission.

8. A non-transitory computer-readable storage medium, wherein the computer-readable storage medium stores a computer program, and the computer program, when being executed by a processor, implements the steps of the method for handling radio link failure according to claim 1.

9. A method for handling radio link failure, applied to a donor node in a relay network architecture in which data transmission is implemented through a relay node, comprising:
   obtaining, through a second link, a first failure report sent by a first node, wherein the first failure report indicates that the first node has received a notification of backhaul recovery failure from a parent node of the first node, or the first failure report indicates that backhaul recovery failure has occurred in the parent node of the first node, or the first failure report indicates that link failure has occurred in a first link, wherein the parent node of the first node is in the first link; wherein
   the first node has dual connectivity with the donor node through the first link and the second link;
   wherein the first failure report comprises:
   a first measurement result, wherein the first measurement result comprises a result obtained by the parent node measuring a second node; and
   a second measurement result, wherein the second measurement result comprises a result obtained by the first node measuring the second node; wherein
   the second node comprises at least some of nodes through which the first failure report passes to be reported to the donor node.

10. The method according to claim 9, further comprising:
    adjusting, based on the first failure report, a network parameter or a network topology.

11. The method according to claim 9, wherein the first failure report further comprises one or more of the following:
    the notification of backhaul recovery failure from the parent node of the first node;
    link quality information of the parent node of the first node; and
    link quality information of the first node.

12. The method according to claim 9, wherein the relay network architecture is an IAB network architecture or a vehicle to everything architecture.

13. A communications device, comprising a processor, a memory, and a program stored in the memory and capable of running on the processor, wherein the program, when being executed by the processor, implements the steps of the method for handling radio link failure according to claim 9.

14. A non-transitory computer-readable storage medium, wherein the computer-readable storage medium stores a computer program, and the computer program, when being executed by a processor, implements the steps of the method for handling radio link failure according to claim 9.

* * * * *